(No Model.) 2 Sheets—Sheet 2.

T. HARDY.
CART.

No. 404,402. Patented June 4, 1889.

Witnesses.
J. Edw. Maybee
Chas. H. Riches.

Inventor.
Thos Hardy
by
Donald C. Ridout & Co
Attys

UNITED STATES PATENT OFFICE.

THOMAS HARDY, OF TORONTO, ONTARIO, CANADA.

CART.

SPECIFICATION forming part of Letters Patent No. 404,402, dated June 4, 1889.

Application filed September 12, 1888. Serial No. 285,193. (No model.)

*To all whom it may concern:*

Be it known that I, THOMAS HARDY, coach-builder, of the city of Toronto, in the county of York, in the Province of Ontario, Canada, have invented a certain new and useful Improvement in Carts, of which the following is a specification.

The object of the invention is to design a trader's cart in which the center of gravity may be made as low as desired without regard to the diameter of the wheels; and it consists, essentially, in supporting the body of the cart on side springs, the ends of which are connected by shackles to a ledge securely braced to the top of each side of the cart, the center of each spring resting on a T-piece forming part of or rigidly fixed to the axle, the said axle having a crank formed in it sufficiently large to contain the body of the cart, the bottom of which extends below the center of the supporting-wheels as close to the ground as the set in the crank of the axle will permit, the whole being otherwise constructed in detail substantially as hereinafter more particularly explained.

Figure 1:
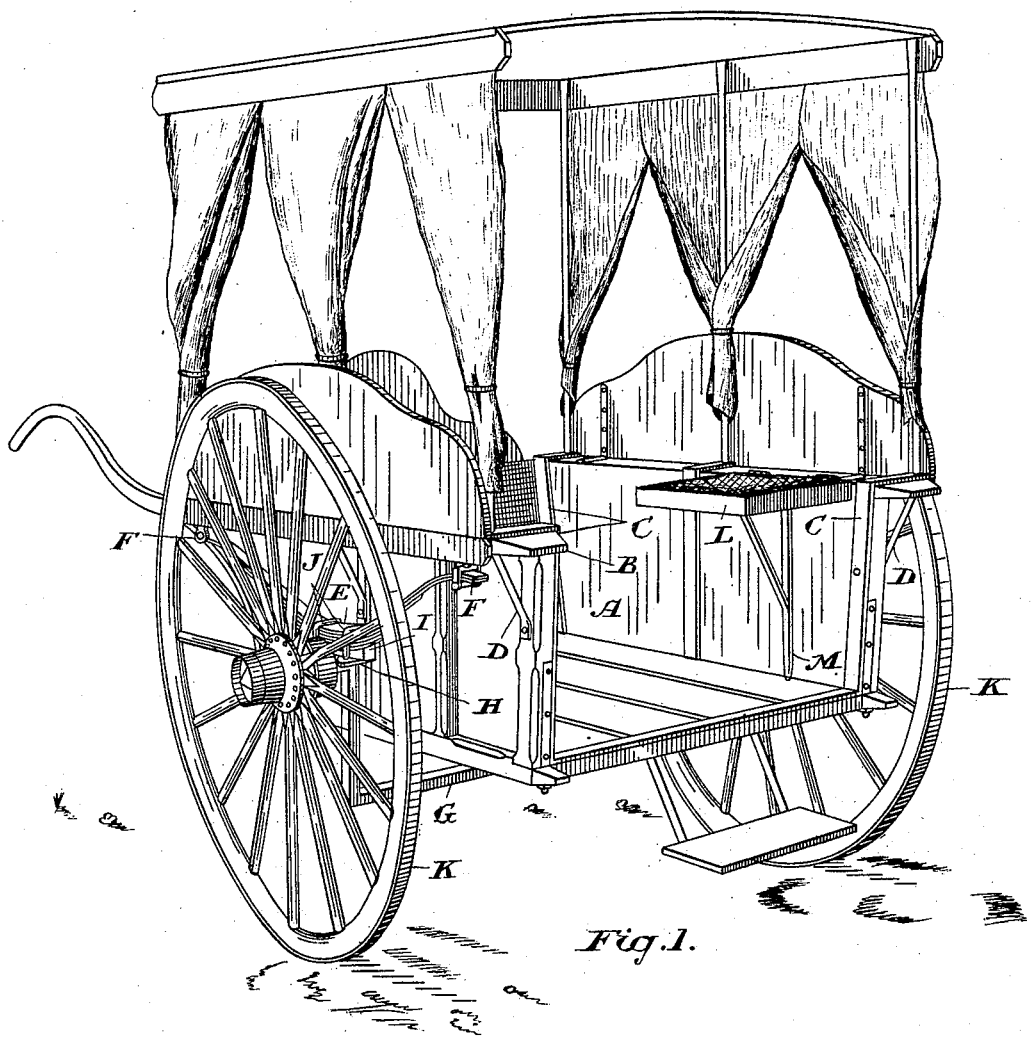
Figure 2:
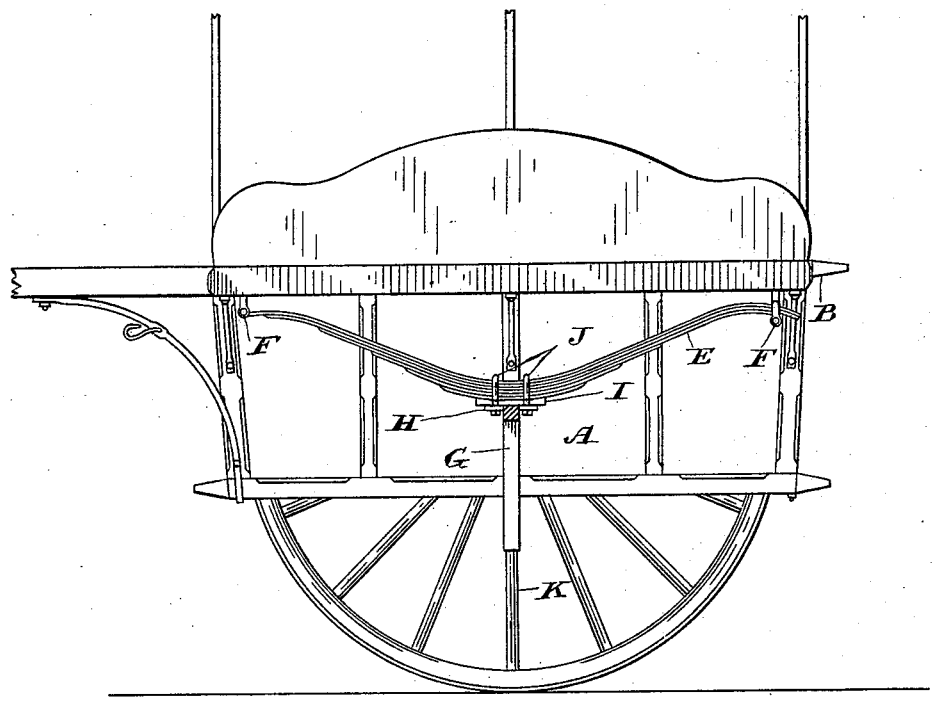

Figure 1 is a perspective view of my improved cart. Fig. 2 is a side view of the cart with one of its wheels removed.

In the drawings, A is the body of the cart, each side of which has a ledge B securely fastened to its top by the bars C and braces D, arranged to make the connection between the ledges and the sides of the cart sufficiently strong to support any load which the cart may be intended to carry.

E represents one of the side springs, the spring on the other side, which is invisible, being located exactly in the same position and connected in the same manner as the one seen. The ends of this spring E are connected to the ledge B by means of the shackles F, and the center of the spring E rests upon the top of the axle G, which has a T-piece H welded or otherwise formed on it to serve as a support for the bottom of the center of the spring E. A plate I is placed between the T-piece H and the bottom of the spring, and the clips J pass around the spring E and the plate I and through holes in the T-piece H, as indicated, thereby securely fastening the spring to the axle. This axle G, it will be noticed, is cranked, so that the body of the cart may extend below the center of the supporting-wheels K as close to the ground as the set in the crank of the axle will permit, which set may be altered to suit the taste of the builder and the purpose for which the cart is made.

L is a seat hinged to the side of the cart and supported by the pivoted bracket M. When the seat is not wanted it can be folded up against the side of the cart, and the bracket M may be turned on its pivot so as to be out of the way.

It will be noticed that a cart made in this manner is not only strong and durable, but its body may be brought as close to the ground as desired without in any way interfering with the proper adjustment of the springs.

What I claim as my invention is—

1. The combination, with the body A, of the ledges B, secured to the top thereof, the bars C, secured to the sides of said body and extended across the tops of said ledges and across the bottom of the body, and the braces D, all substantially as shown and described, and for the purpose specified.

2. The combination, with the axle having a crank formed in it, as shown, the body, and the ledges secured to the top of said body, of the springs secured at their ends to the under side of said ledges, the T-pieces on the axle, the plate between the T-pieces and the bottom of the spring, and the clips J, passed around said spring and plate and through holes in the T-pieces, substantially as and for the purposes specified.

Toronto, August 25, 1888.

THOMAS HARDY.

In presence of—
 F. H. THOMPSON,
 CHARLES C. BALDWIN.